INVENTORS
RICHARD E. REASON
JOHN R. ADAMS

March 24, 1970  R. E. REASON ET AL  3,501,949
SURFACE TESTING APPARATUS EMPLOYING ARCUATE SENSOR PATH
Filed Aug. 31, 1967  5 Sheets-Sheet 3

INVENTORS
RICHARD E. REASON
JOHN R. ADAMS

INVENTORS
RICHARD E. REASON
JOHN R. ADAMS

United States Patent Office 3,501,949
Patented Mar. 24, 1970

1

3,501,949
SURFACE TESTING APPARATUS EMPLOYING
ARCUATE SENSOR PATH
Richard Edmund Reason and John Reginald Adams,
Leicester, England, assignors to The Rank Organisation
Limited, London, England
Filed Aug. 31, 1967, Ser. No. 664,871
Claims priority, application Great Britain, Sept. 15, 1966,
41,223/66
Int. Cl. G01b 5/28
U.S. Cl. 73—105                              15 Claims

ABSTRACT OF THE DISCLOSURE

In a surface testing apparatus a workpiece is supported on a table and its surface traversed in an arcuate path by a stylus which is supported in a pick-up head for rotation through a small angle about a main axis perpendicular to a worktable support. The worktable is tiltable relative to its support, thereby adjusting the plane of the arcuate stylus path so that it differs slightly from a perpendicular relation to the main axis, thereby compensating for any curvature of the workpiece surface along the path of traversal of the stylus. A transducer on the pick-up head is responsive to working movements of the stylus parallel to the main axis during traversal of the stylus.

---

This invention relates to surface testing apparatus, more especially intended for measuring the height of a small step in the surface of a workpiece, such for example as for measuring the depth of a shallow groove in the surface of a thin workpiece made of semi-conducting material or for measuring the thickness of a thin coating deposited on the surface of the workpiece. The quantities to be measured are very small indeed, so that it is often desirable to use a magnification of a million times or more in order to obtain a satisfactory measurement. Hitherto apparatus primarily designed for measuring surface roughness has been used for this purpose, but such use has its shortcomings, and the present invention has for its object to provide a simplified form of such apparatus whereby the desired measurements can be satisfactorily effected, without the inconveniences involved in the use of the normal apparatus.

The surface testing apparatus according to the present invention comprises a support, a worktable adjustably mounted on the support for carrying the workpiece whose surface is to be tested, a frame hinged to the support about a main axis, a pick-up head carried by the frame, means whereby the pick-up head can be adjusted relatively to the frame in a direction parallel to the main axis, a stylus mounted on the pick-up head for motion parallel to the said main axis for engaging with the surface to be tested, means for swinging the frame through a small angle about the said main axis, whereby the stylus is traversed in an arcuate path along the test surface, the mounting of the stylus on the pick-up head permitting the stylus during such traversing movement to perform small working movements in a direction substantially parallel to the main axis, means for tilting the worktable relatively to the support through a small angle in any desired direction about a centre which in the direction parallel to the main axis is in line with an intermediate point in the traversing path of the stylus, whereby with a minimum of displacement in the direction of the main axis the test surface can be adjusted into a position in which it lies substantially at right angles to the main axis, a transducer on the pick-up head responsive to working movements of the stylus in a direction parallel to the main axis during the traversing movement, and an indicating instrument controlled by such transducer for giving a desired indication dependent on such working movements.

The arcuate movement about a hinge has the advantage of simplicity in contrast with the drives usual in surface roughness instruments, for which the arcuate movement would not be suitable since it would be applicable only to use with plane test surfaces, but it is adequate for the present purpose, and has the advantage of enabling compensation to be made for slight curvature of the test surface. Owing to the small angle of the frame movement, the arcuate traversing path of the stylus diverges very little from a straight line path, but nevertheless with the very large magnification used even slight curvature of the test surface could lead to substantial errors, which, however, can be rendered negligible by the tilting adjustment of the worktable, the component of such tilt in the direction of the traversing movement taking care of any necessary levelling of the surface, whilst the component of tilt in the other direction, in a plane at right angle to the direction of traversing takes care of any residual curvature which would produce stylus movements parallel to the main axis during traversing.

Preferably, the worktable engages with a rounded abutment which is carried by the support and provides the centre about which the worktable can be tilted, and also with two adjusting screws by operation of which the tilting of the worktable is effected. The two adjusting screws can be arranged in various ways to give the desired resultant tilt in any direction but in one convenient arrangement, means are provided for coupling the two adjusting screws for operation in unison whereby, the worktable will be tilted about an axis parallel to the line joining them, such line being approximately parallel to the direction of traversing of the stylus, at least one of the adjusting screws also being independently operable for tilting the worktable about a different axis. In such case, the tilting of the worktable about the axis approximately parallel to the direction of traversing preferably has a higher rate of movement relatively to the operation of the adjusting screws than the tilting about the said different axis, thus giving a lower rate of adjustment for levelling purposes than for correcting curvature. One such practical construction includes means for permanently connecting the two adjusting screws for rotation in unison, a rotatable finger disc fixedly mounted on the first adjusting screw for effecting simultaneous and equal axial movement of the two adjusting screws, a sleeve differentially screwthreaded for engagement with a screwthread on the second adjusting screw and a screwthread on the support, and a second rotatable finger disc fixedly mounted on such sleeve for effecting axial movement of the second adjusting screw but not rotation thereof.

Means are preferably provided for effecting sliding adjustment of the worktable over the rounded abutment and the two adjusting screws for positioning the workpiece relatively to the traversing path of the stylus. Such sliding adjustment is preferably effected translationally in two mutually perpendicular directions, means being provided for preventing any rotational sliding movement of the worktable in the plane containing the three points on which it is supported.

The support may conveniently be formed in two parts, one of which constitutes a base, whilst the other constitutes a body member carrying the hinge for the frame and the rounded abutment for the worktable, such body member being secured to the base through pads which act to reduce transmission to the body member of any strains to which the base may be exposed.

The hinge between the frame and the support is preferably constituted by one or more spring ligaments, thereby minimising errors in the arcuate traversing movement of the stylus. For stability during traversing, the effective length of the frame hinge should be large in comparison with the distance of the stylus form the main axis, conveniently at least twice as large as such distance.

The mounting means for the stylus on the pick-up head is preferably constituted by parallel ligament hinges. The arrangement conveniently includes means, such as a spring, in the pick-up head for approximately counterbalancing the weight of the stylus, and fine adjustment means for controlling the contact pressure of the stylus on the test surface.

The transducer may comprise a moving member directly connected to the stylus and a stator member, which in its normal operative position permits only limited movement of the stylus, such stator member being movably mounted on the pick-up head and normally held by spring means in its operative position, so that it will remain in such position during normal working movements of the stylus but will yield in the event of excessive movement of the stylus.

If desired, a viewing microscope may be provided, adjustably mounted on the support, whereby it can be moved into the correct position for viewing the operative engagement of the stylus with the test surface. The optical axis of the microscope may be obliquely inclined to the test surface, and the objective thereof may be inclined at such an angle to the optical axis of the microscope as to maintain the test surface substantially in focus throughout the field of view of the microscope.

The invention may be carried into practice in various ways, but the following may be instanced as a preferred practical construction of surface testing apparatus according thereto.

With reference to the accompanying drawings.

Figure 1:
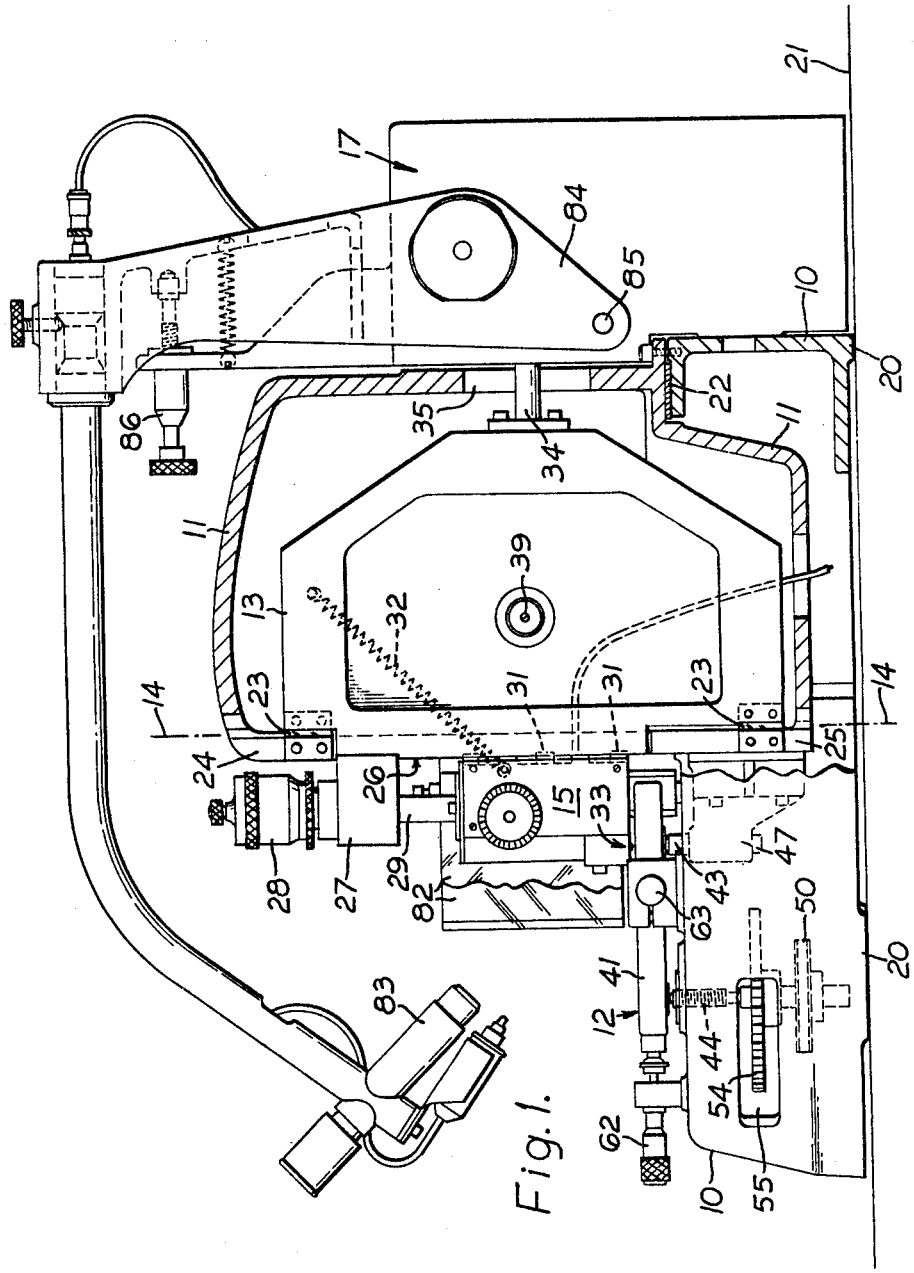
FIGURE 1 is a side elevation, partly cut-away, of the surface testing apparatus.

In this construction, the apparatus comprises a base 10, a body member 11 secured to the base, a worktable 12 adjustably mounted on the base and body member for carrying the workpiece whose surface is to be tested, a frame 13 hinged to the body member about a main axis 14, a pick-up head 15 carried by the frame and adjustable thereon in a direction parallel to the main axis, such pick-up head carrying a stylus for engaging with the workpiece surface and a transducer responsive to working movements of the stylus, in a direction parallel to the main axis, a drive unit 17 for swinging the frame through a small angle about its hinge, and an indicating instrument controlled through an amplifier by the transducer.

The apparatus will usually be mounted with the main axis 14 vertical or approximately vertical, although this is not essential, and for simplicity, of description it will be assumed that the main axis is vertical.

The base rests on feet 20, for example on a workbench 21, and the body member 11 extends upwardly from the rear portion of the base 10 and is secured thereto at three points through pads 22 which serve to reduce transmission to the body member of any strain to which the base may be exposed.

The hinge between the frame 13 and the body member 11 is constituted by one or more (preferably two) flat spring ligaments 23 and for this purpose the body member is provided near its front end with upper and lower brackets 24 and 25, to each of which is secured one end of a ligment. The other ends of the ligaments 23 are similarly secured to the frame, the two ligaments being aligned with one another so that the frame 13 can swing through a small angle relatively to the body member 11 accurately about a vertical axis constituting the main axis 14 abovementioned.

The frame has a vertical front surface 26 nominally parallel to the main axis 14, and near the top of such surface a part 27 projects forwardly, to carry a micrometer head 28 which is coupled with the pick-up head 15 by a round-ended rod 29. The pick-up head 15 is provided with three feet, two of which slide in a vertical V-groove in the front surface 26 of the frame, whilst the third engages with the flat front surface itself, an inclined tension spring 32 being provided to urge the pick-up head 15 towards the front surface of the frame and into contact with the micrometer 28 through a coupling rod passing through a draught protecting screen 82. Mounted within the pick-up head 15 for vertical movement relatively thereto (as will be described in detail later) is a stylus 33, which projects through the bottom of the pick-up head for co-operation with the workpiece surface to be tested.

For stability, it is desirable that the effective length of the frame hinge, as determined by the positions of the upper and lower ligaments 23, should be considerably larger than and preferably at least twice as large as, the distance of the stylus in front of such hinge axis 14.

Figure 2:
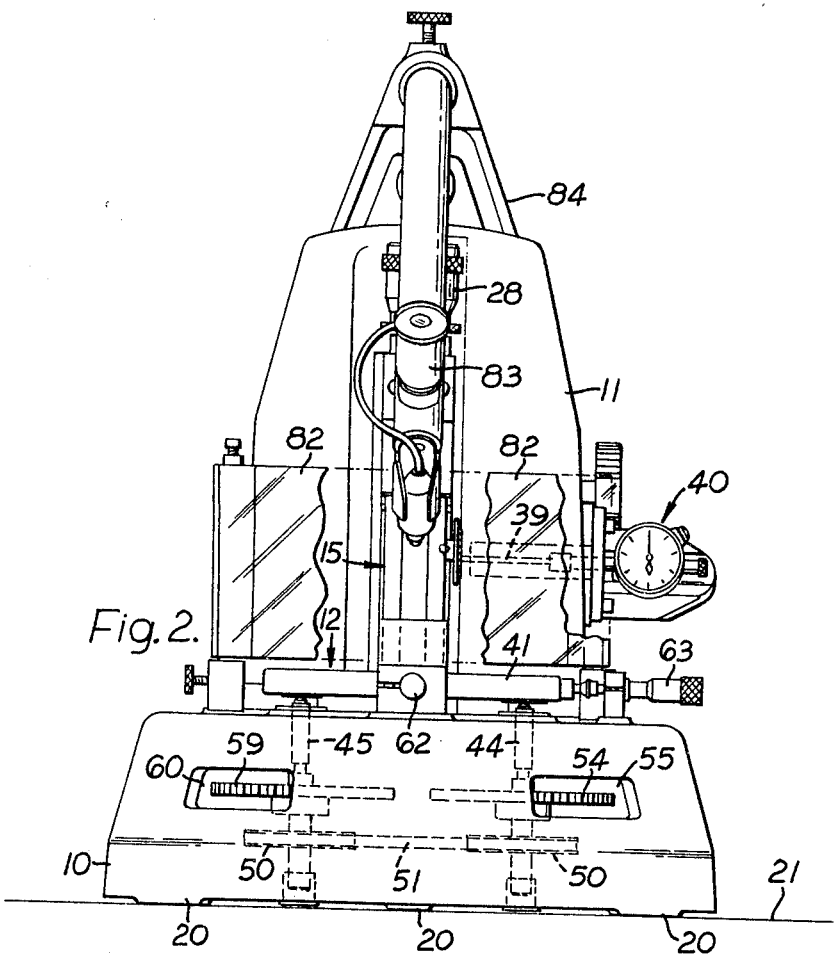
FIGURE 2 is a front elevation, also partly cut-away, of said surface testing apparatus.
Figure 3:
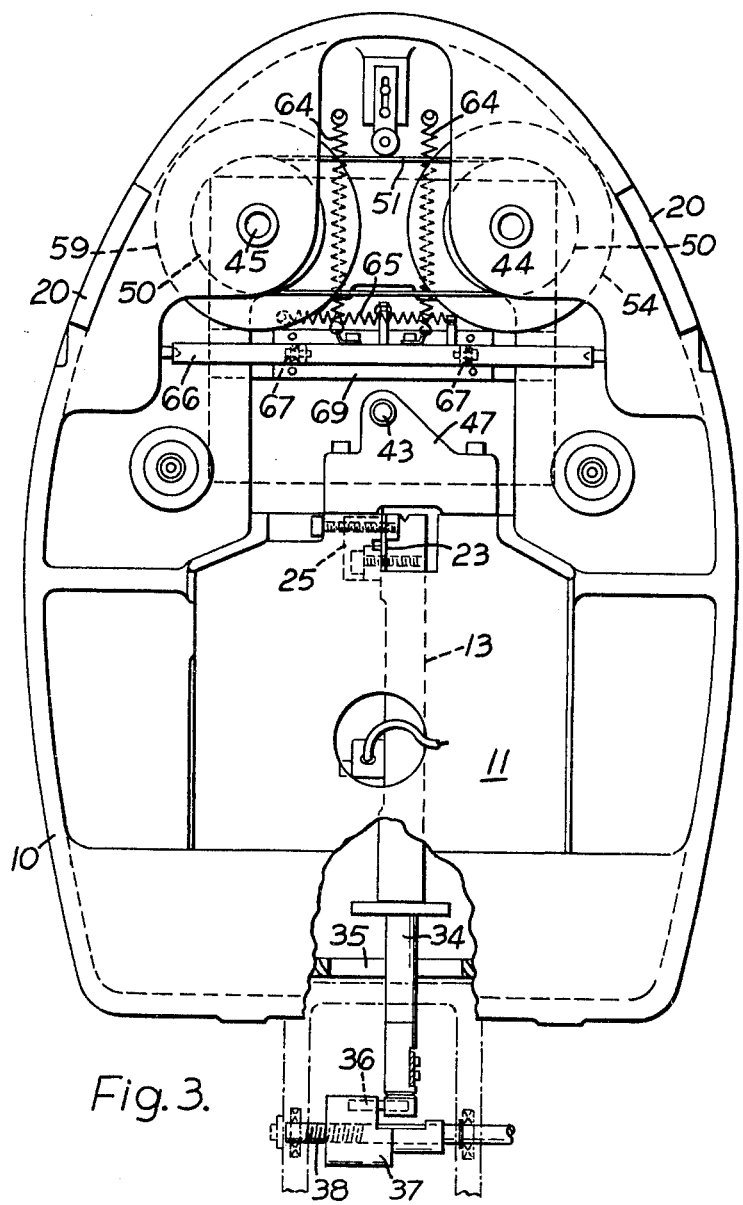
FIGURE 3 is a bottom plan view, partly cut-away, of the surface testing apparatus.

A horizontal arm 34 projects rearwardly from the frame 13 through an opening 35 in the rear of the body member 11 and is engaged near its projecting end through a flexible coupling 36 (FIGURE 3) with a drive unit comprising a nut 37 and lead screw 38 and reversible electric motor (not shown) secured to the rear of the base 10, thereby causing the frame 13 to swing about the main axis 14, so that a traversing movement along an arcuate path centered on the main axis will be imparted to the stylus 33. The drive unit 17, incorporating the reversible motor, is provided with suitable controls whereby three traversing speeds can be imparted to the stylus, namely a relatively fast speed for initial setting purposes and two alternative relatively slow speeds for the operational traverse. A rod 39 extending laterally from the frame through an opening in the side wall of the body member operates an indicator 40 (FIGURE 2) for indicating the extent of the traversing movement of the stylus 33 in either direction from its normal centre zero position.

Figure 4:
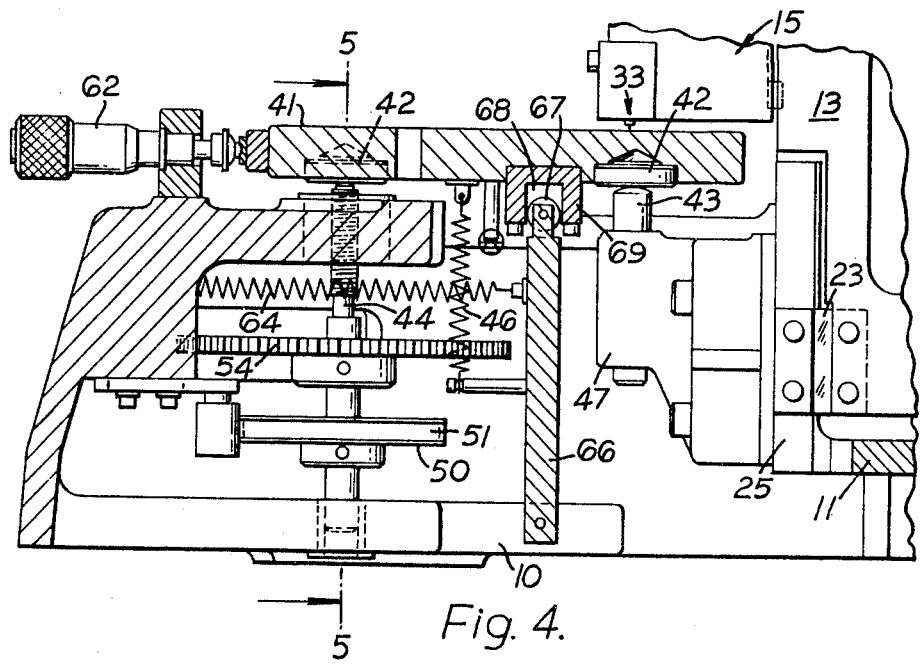
FIGURE 4 is a longitudinal vertical section, on an enlarged scale, through the base of the apparatus.
Figure 5:
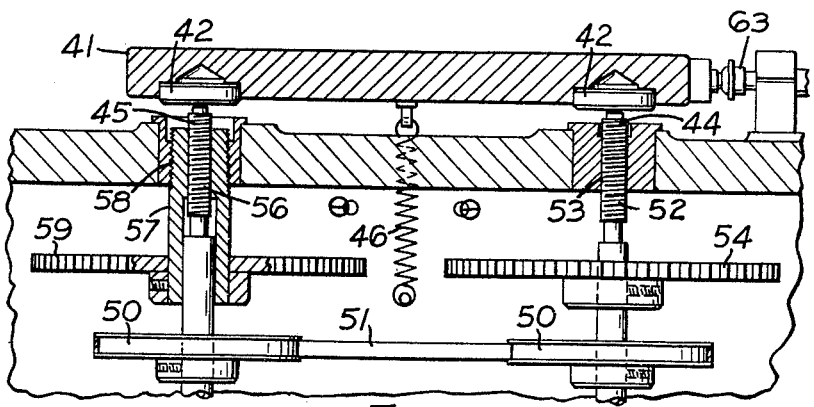
FIGURE 5 is a vertical transverse section through the base of the apparatus, taken on line 5—5 of FIGURE 4; and, FIGURE 6 is a side elevational view, on an enlarged scale, of the pick-up head of the apparatus, with the casing thereof shown cut-away.
Figure 6:
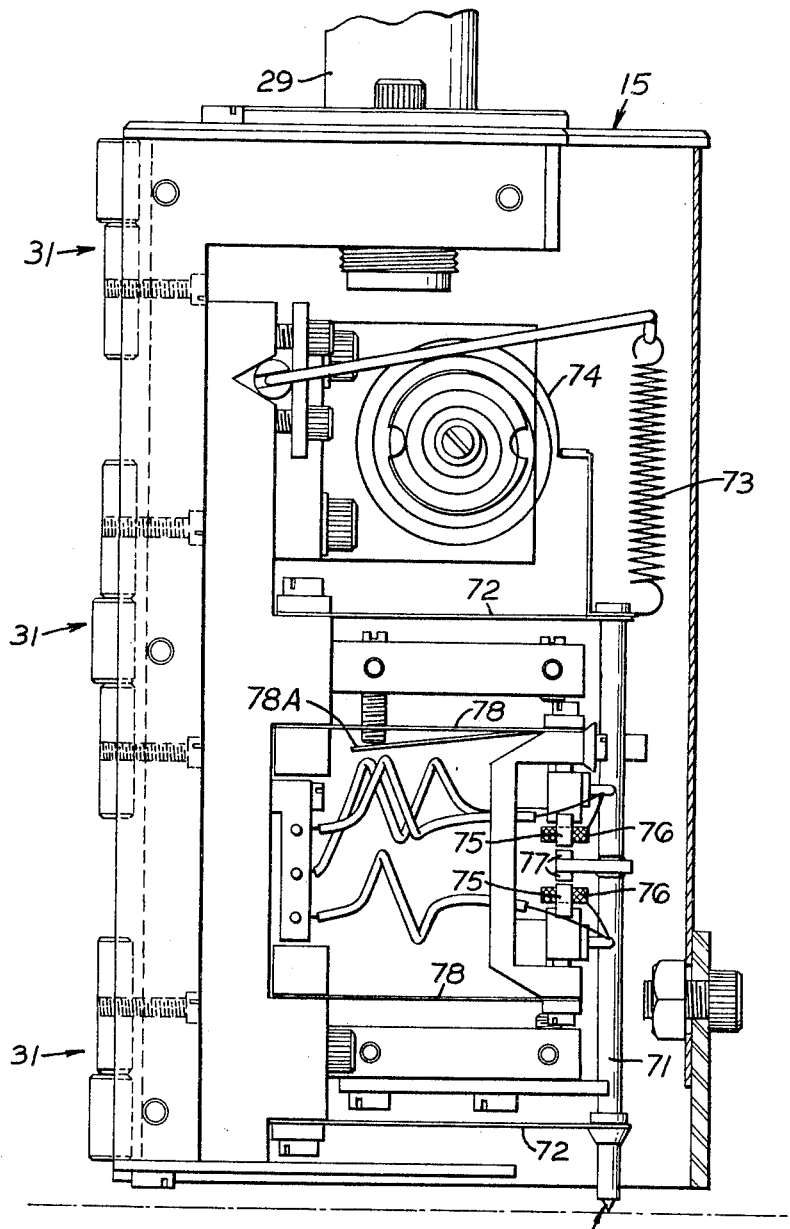

Supported over the front portion of the base 10 in front of the body member 11, is a worktable 41 for carrying the workpiece whose surface is to be tested. This worktable 41 is provided with various adjustments to ensure that the test surface is correctly positioned in relation to the stylus. For this purpose, the under surface of the worktable 41 is provided with three hardened inserts 42 (FIGURES 4 and 5) which rest respectively on a rounded abutment 43 and on two adjusting screws 44 and 45, a spring 46 being provided to hold the worktable down on its three point support. The rounded abutment 43 is carried by a forward projection 47 from the body member 11 and serves as a centre about which the worktable 41 can be tilted in any desired direction, by the operation of the adjusting screws 44 and 45.

This rounded abutment 43 lies vertically beneath the centre zero position of the stylus traversing movement, so that the tilting of the worktable 41 will have only a negligibly small effect on the vertical position of the stylus 33, when the stylus is in its centre zero position in engagement with the workpiece surface.

The tilting of the worktable 41 serves, not only as a levelling adjustment to ensure that the portion of the workpiece surface with which the stylus 33 engages during its traversing movement is substantially horizontal, but also to cater for any slight curvature in the workpiece surface which would produce vertical deflection of the stylus 33 during traversing movement thereof. For the measurements to be made are extremely small and, as will be explained later, a very large amplification factor is used, so that even very slight curvature of the workpiece could drive the indicator off its scale. Such slight curvature of the workpiece surface in the direction of traversing of the stylus can be taken into account by tilting the worktable 41 in a plane at right angles to the mean direction of traversing of the stylus.

Upon traversal the stylus 33 will in general generate a cylindrical surface. The path of traversal of the stylus 33 over the workpiece surface upon swinging of the frame 13 about the main axis 14 will be the line of intersection of the cylindrical surface with the workpiece surface, and in general this line will not lie in a single plane but will, as a result of workpiece curvature along the line of traverse, have the form of a hill or valley between the two ends of the traverse. The stylus 33 will indicate the surface irregularities superimposed on a profile which is derived from two sources: (a) curvature of the workpiece surface along the track of the stylus 33; and (b) tilting of the plane of the workpiece about an axis substantially parallel to the mean direction of stylus traverse. By suitably tilting the workpiece in a plane at right angles to the direction of traverse, it is possible to arrange that the stylus deflection derived from one of these sources is substantially compensated by that derived from the other. A separate tilting adjustment is required to level the workpiece surface in the direction of traverse of the stylus.

The two adjusting screws 44 and 45 can be arranged in a variety of ways to enable these two tilting adjustments to be made, but one convenient arrangement will now be described.

In this arrangement the two adjusting screws 44 and 45 are mounted vertically on the base 10 at the corners of an isosceles triangle at whose apex the rounded abutment 43 is located, the line joining the points of engagement of the two adjusting screws 44 and 45 with the worktable 41 lying approximately parallel to the direction of traversing of the stylus 33. The two adjusting screws 44 and 45 are journalled in the base 10 for rotational and axial movement and they each carry a pulley wheel 50, the two pulley wheels 50 being permanently coupled to one another by means of a belt 51, so that any rotation of one adjusting screw will cause equal rotation of the other adjusting screw in the same direction.

The first adjusting screw 44 has a screw-thread 52 (FIGURES 2 and 5) directly engaging with a fixed screwthread 53 on the base 10, so that rotation of the screw 44 will cause the screw to perform an axial movement dependent on the pitch of the co-operating screwthreads. A finger disc 54 mounted on the screw protrudes through a lateral opening 55 (FIGURE 2) in the base 10 and serves for operating this screw.

The second adjusting screw 45 has a screwthread 56, of the same pitch as that on the first adjusting screw 44, but in this case the co-operating screwthread is on the inner surface of a sleeve 57, whose outer surface has a screwthread of different pitch co-operating with a fixed screwthread 58 on the base 10. A second finger disc 59 which protrudes through another lateral opening 60 in the base 10, is mounted on such sleeve 57 for imparting rotation thereto.

With this arrangement, operation of the first finger disc 54 on the first adjusting screw 44 will cause the two screws 44 and 45 to rotate in unison and also to move axially in unison, the frictional forces being such that the sleeve 57 around the second adjusting screw 45 will not rotate when the first finger disc 54 is operated. This will cause the worktable 41 to tilt about an axis approximately parallel to the direction of traversing of the stylus 33 and passing through the point of engagement of the rounded abutment 43 within the worktable. This tilting adjustment serves to compensate for any slight curvature of the workpiece surfaces in the direction at right angles to the direction of traversing.

Operation of the second finger disc 59 will cause the sleeve 57 to rotate and move axially in the fixed screwthread 58 on the base 10, and owing to the difference between the pitches of the screwthreads on the inner and outer surfaces of the sleeve 57, this will also cause the second adjusting screw 45 to move axially, the frictional forces being such that the second adjusting screw 45 will not rotate when the second finger disc 59 is operated. The first adjusting screw 44 will therefore remain unaffected by the operation of the second finger disc 59 and will remain stationary. Thus, operation of the second finger disc 59 will cause the worktable 41 to tilt about the line joining the points of engagement with the worktable of the first adjusting screw 44 and the rounded abutment 43. Whilst it is true that this axis of tilt is not at right angles to the direction of traversing of the stylus 33, it will be clear that the tilt can be resolved into two perpendicular components, one in the required direction and the other in the direction of curvature correction on which it will generally have a negligible effect. Thus by appropriate operation of the two finger discs 54 and 59 any combination of levelling adjustment in the direction of traversing and of curvature compensation can be dealt with. The relationship between the pitches of the various screwthreads is so chosen that the angle of tilt of the worktable 41 for a given movement of the first finger disc 54 is greater than that for a corresponding movement of the second finger disc 59 because the levelling adjustment is the more sensitive of the two.

In order to bring the correct portion of the workpiece surface into engagement with the stylus 33, two micrometer heads 62 and 63 are provided respectively for causing the worktable 41 to slide in two directions at right angles to one another over the rounded abutment 43 and the two adjusting screws 44 and 45, springs 64 and 65 being provided for holding the worktable 41 properly in engagement with such micrometer heads.

Means are provided for keying the worktable 41 against rotation about any axis normal to the surface of the worktable. One convenient method of achieving this without affecting the sliding of the worktable over the rounded abutment 43 and the two adjustment screws 44 and 45 is by means of a guide member 66 hinged to the base 10, the axis of such hinge being parallel to one of the controlled directions of movement of the worktable 41. The upper edge of the guide member 66 carries two small ball races 67 positioned to engage in the groove 68 of a channelsection bar 69 rigidly attached to the underside of the worktable, the axis of the races 67 being in line and in a plane parallel to the hinge attaching the guide member 66 to the base 10. When the table 41 is moved by the micrometer 62 in a direction at right angles to the axis of the torsion member hinge, the guide member 66 will rotate, the groove 68 in the channel-section bar 69 being of sufficient depth to accommodate the resultant rise and fall of the races 67. When the table 41 is moved by the second micrometer 63 in the direction parallel to the axis of the torsion member hinge, the torsion member 66 remains stationary and the races 66 slide in the groove 68 of the channel-section bar 69.

It will be noted that both the rounded abutment 43 and the frame hinge are carried by the body member 11 and are thus protected by the pads 22 between such member and the base 10 against any strains to which the base may be exposed. The two adjusting screws 44 and 45 could also, if desired, be carried by the body member 11, instead of by the base 10, but since these adjusting screws are associated only with tilting adjustment of the worktable 41 about the rounded abutment 43, any such strains transmitted from the base 10 to the worktable 41 through such screws will have little harmful effect on the operation of the apparatus.

The stylus 33 is mounted on the lower end of a vertical rod 71 carried on parallel ligaments 72 in the pick-up head 15, and means (such as helical spring 73) are provided to counterbalance the weight of such rod 71 and the parts carried thereby. In addition, a hair spring 74, is provided to exert a force on the stylus 33 to give the desired contact pressure of the stylus on the test surface, means being provided for adjusting the hair spring force to enable such contact pressure to be chosen to suit the conditions of each individual case.

The stylus rod 71 carries the movable member of the transducer, which may take various forms but is conveniently of the electro-magnetic type. In the preferred arrangement, the transducer comprises two E-shaped magnetic cores 75 respectively bearing two windings 76 which are differentially connected in an output circuit, the stylus rod 71 carrying two armatures 77, one for each core 75, the arrangement being such that longitudinal movement of the stylus rod 71 will increase the air gap between one of the armatures 77 and its associated core 75 and simultaneously decrease the air gap between the other armature and its associated core. It will thus be clear that the stator member of the transducer, incorporation the two E-shaped magnetic cores 75, in its normal operative position imposes a limit on the permissible movement of the stylus 33, and in order to protect the part from damage resulting from excessive stylus movement, for example during setting-up, the stator member of the transducer is itself carried on parallel spring ligaments 78 in the pick-up head, such ligaments being arranged to exert a spring force normally holding the stator member against a stop 78A in its operative position. Thus, whilst the stator member will remain held in its normal operative position throughout ordinary operation of the apparatus, its mounting is such that it will yield in the event of over setting of the micrometer 28 tending to cause excessive movement of the stylus.

The output circuit from the transducer is taken through flexible leads to an amplifier (not shown), whose output directly controls an indicating or recording instrument, whereby a desired indication is given dependent on the working movement of the stylus 33 during its traversing movement along the test surface. Since the measurements to be obtained are themselves extremely small, an amplification factor up to a million times, or even more is used. The amplifier and the indicating or recording instrument are preferably mounted independently of the main apparatus and are connected thereto only by flexible leads. The necessary switches for controlling the operation of the reversible electric motor and of the amplifier and the indicating or recording instrument are preferably also mounted in a separate unit connected by flexible leads to the main apparatus and to the amplifier unit. In view of the extreme sensitivity of the apparatus, the main apparatus is provided with draught-excluding screens 82 to minimise temperature fluctuations.

An observing microscope 83 is preferably provided to enable the operative engagement of the stylus 33 with the test surface to be observed. Such microscope 83 is carried by a forked arm 84 which straddles the connection from the frame 13 to the reversible motor and is pivoted to the back of the body member 11, such arm 84 passing over the top of the body member and carrying the microscope at its front end, so as to allow free manual access to the worktable.

The pivot 85 of such arm is on a level with the middle of the path of vertical adjustment of the stylus 33 and a micrometer head 86 is provided to adjust the arm 84 about its pivot 85 relatively to the body member 11, so as to raise or lower the microscope 83 into the correct position for observation of the workpiece surface. In order to give a clear view of such surfaces, unobstructed by the body of the pick-up head, the optical axis of the microscope is inclined at an angle to the vertical. If desired, the objective of the microscope may be tilted relatively to the optical axis of the microscope so that the modal plane of the objective of the microscope will pass approximately through the line of intersection of the image plane of the microscope with the operative plane of the test surface, thereby ensuring that the whole of the portion of the test surface within the field of view of the microscope will be properly in focus.

In operation, starting with the pick-up head in a raised position, the workpiece is mounted on the worktable and the two micrometer heads are operated to slide the worktable over its three-point support to bring the particular portion of the workpiece surface to be examined into a position directly beneath the stylus. The pick-up head is then lowered to bring the stylus into engagement with the workpiece surface, and the hair spring is adjusted to give the correct contact pressure. The reversible motor is then started up at its fast speed to effect traversing of the stylus. Any necessary tilting adjustments of the worktable are then made to ensure that the cross-section traced out by the recording instrument, remains on the chart throughout the whole traverse (or alternatively, when a simple indicating instrument is used, that the indication remains within the scale of the instrument throughout the whole traverse). The apparatus is then ready for the desired operational traverse at the chosen slow speed, the vertical working movements of the stylus during such traverse, dependent upon the characteristics of the workpiece surface, controlling the output of the transducer, so that the desired greatly amplified indication of the surface characteristics is obtained.

It will be appreciated that the foregoing construction has been described by way of example only and that various modifications thereof within the scope of the in-invention may be made. Thus, forms of transducer other than the electromagnetic transducer described may be used, and the stylus may be mounted on one arm of a pivoted lever whose other arm carries the moving member of the transducer. Again other adjusting screw arrangements may be employed for effecting the desired tilting of the worktable and vertical adjustment of the pick-up head.

What we claim is:

1. Surface testing apparatus, more especially intended for measuring the height of a small step in the surface of a workpece, comprising a support, a worktable adjustably mounted on the support for carryng the workpiece whose surface is to be tested, a frame hinged to the support about a main axis, a pick-up head carried by the frame, means whereby the pck-up head can be adjusted relatively to the frame in a direction parallel to the main axis, a stylus mounted on the pick-up head for motion parallel to said main axis for engaging with the surface to be tested, means for swinging the frame through a small angle about the said main axis, whereby the stylus is traversed in an arcuate path along the test surface, means for tilting the worktable relatively to the support through a small angle in any desired direction about a centre which in the direction parallel to the main axis is in line with an intermediate point in the traversing path of the stylus whereby with a minimum of displacement in the direction of the main axis the test surface can be adjusted into a position in which it lies substantially at right angles to the main axis, a transducer on the pick-up head responsive to working movements of the stylus, in a direction parallel to the main axis during the traversing movement, and an indicating instrument controlled by such transducer for giving a desired indication dependent on such working movement.

2. Surface testing apparatus as claimed in claim 1 in which the hinge between the frame and the support is constituted by one or more spring ligaments.

3. Surface testing apparatus as claimed in claim 1, including a rounded abutment which is carried by the support and which provides the center about which the worktable is tiltable, and further including two adjusting screws engaging the worktable and carried by the support, said screws being operative to effect tilting of the worktable.

4. Surface testing apparatus as claimed in claim 3, including means coupling the two adjusting screws for operation in unison whereby the worktable will be tilted about an axis parallel to the line joining them, such line being approximately parallel to the direction of traversing of the stylus, and further including means independently operating at least one of the adjusting screws for tilting the worktable about a different axis.

5. Surface testing apparatus as claimed in claim 4, in which the tilting of the worktable about the axis approximately parallel to the direction of traversing has a higher rate of movement relatively to the operation of the adjusting screws than the tilting about the said different axis.

6. Surface testing apparatus as claimed in claim 4, including means permanently connecting the two adjusting screws for rotation in unison, a rotatable finger disc fixedly mounted on the first adjusting screw for effecting simultaneous and equal axial movement of the two adjusting screws, a sleeve differentially screw threaded for engagement with a screw thread on the second adjusting screw and a screw thread on the support, and a second rotatable finger disc fixedly mounted on such sleeve for effecting axial movement of the second adjusting screw but not rotation thereof.

7. Surface testing apparatus as claimed in claim 3, including sliding means for effecting sliding adjustment of the worktable over the rounded abutment and the two adjusting screws for positioning the workpiece relatively to the traversing path of the stylus.

8. Surface testing apparatus as claimed in claim 7, including means for preventing any rotational sliding movement of the worktable in the plane containing the three points on which it is supported, said sliding means effecting sliding movement of the worktable translationally in two mutually perpendicular directions.

9. Surface testing apparatus as claimed in claim 3, in which the support is formed in two parts, one of which constitutes a base, whilst the other constitutes a body member carrying the hinge for the frame and the rounded abutment for the worktable, such body member being secured to the base through pads which act to reduced transmission to the body member of any strain to which the base may be exposed.

10. Surface testing apparatus as claimed in claim 1, in which the effective length of the frame hinge is at least twice as large as the distance of the stylus from the main axis.

11. Surface testing apparatus as claimed in claim 1, in which the mounting means for the stylus on the pick-up head is constituted by parallel ligament hinges.

12. Surface testing apparatus as claimed in claim 11, including means on the pick-up head for approximately counterbalancing the weight of the stylus, and fine adjustment means for controlling the contact pressure of the stylus on the test surface.

13. Surface testing apparatus as claimed in claim 11, in which the transducer comprises a moving member directly connected to the stylus and a stator member which in its normal operative position permits only limited movement of the stylus, such stator member being movably mounted on the pick-up head and normally held by spring means in its operative position during normal working movements of the stylus but will yield in the event of excessive movement of the stylus.

14. Surface testing apparatus as claimed in claim 1, including a viewing microscope adjustably mounted on the support, whereby it can be moved into the correct position for viewing the operative engagement of the stylus with the test surface.

15. Surface testing apparatus as claimed in claim 14, in which the optical axis of the microscope is obliquely inclined to the test surface, and the objective of the microscope is inclined at such an angle to the optical axis of the microscope as to maintain the test surface substantially in focus throughout the field of view of the microscope.

References Cited

UNITED STATES PATENTS

| | | | |
|---|---|---|---|
| 2,620,655 | 12/1952 | Priest | 73—105 |
| 2,953,017 | 9/1960 | Bincer et al. | 73—67.8 |
| 3,025,700 | 3/1962 | Reason | 73—105 |
| 3,382,707 | 5/1968 | Heselwood | 73—71.5 |

RICHARD C. QUEISSER, Primary Examiner

E. J. KOCH, Assistant Examiner